US012711689B2

(12) United States Patent
Marino et al.

(10) Patent No.: US 12,711,689 B2
(45) Date of Patent: Aug. 18, 2026

(54) SYSTEM AND METHOD FOR DISPLAYING REACTION ANIMATIONS

(71) Applicant: 17707461 Canada Inc., Montréal (CA)

(72) Inventors: David Giovanni Marino, Montréal (CA); Max Henry, Outremont (CA); Pascal Fortin, Jonquière (CA); Jeremy Cooperstock, Westmount (CA)

(73) Assignee: 17707461 Canada Inc., Montréal (CA)

( * ) Notice: Subject to any disclaimer, the term of this patent is extended or adjusted under 35 U.S.C. 154(b) by 51 days.

(21) Appl. No.: 18/463,799

(22) Filed: Sep. 8, 2023

(65) Prior Publication Data

US 2024/0087203 A1 Mar. 14, 2024

Related U.S. Application Data

(60) Provisional application No. 63/404,755, filed on Sep. 8, 2022.

(51) Int. Cl.
*G06T 13/80* (2011.01)
*G06T 7/70* (2017.01)
*G06V 40/16* (2022.01)

(52) U.S. Cl.
CPC ................ *G06T 13/80* (2013.01); *G06T 7/70* (2017.01); *G06V 40/171* (2022.01); *G06V 40/176* (2022.01)

(58) Field of Classification Search
None
See application file for complete search history.

(56) References Cited

U.S. PATENT DOCUMENTS

| | | | | |
|---|---|---|---|---|
| 9,996,940 | B1 * | 6/2018 | Yamasaki | G06T 11/00 |
| 2022/0132224 | A1 * | 4/2022 | Hayashi | H04N 21/2668 |
| 2023/0012919 | A1 * | 1/2023 | Park | G06V 10/454 |
| 2023/0298240 | A1 * | 9/2023 | Hayata | G06F 3/0482 345/473 |
| 2024/0037371 | A1 * | 2/2024 | Chen | G06N 20/00 |
| 2024/0378781 | A1 * | 11/2024 | Yamagishi | H04N 7/18 |
| 2025/0118105 | A1 * | 4/2025 | Hirasawa | G06V 40/174 |

OTHER PUBLICATIONS

Mariam Hassib, Stefan Schneegass, Niels Henze, Albrecht Schmidt, and Florian Alt. 2018. A Design Space for Audience Sensing and Feedback Systems. In Extended Abstracts of the 2018 CHI Conference on Human Factors in Computing Systems. 1-6.

(Continued)

*Primary Examiner* — Jeffrey J Chow
(74) *Attorney, Agent, or Firm* — Brion Raffoul

(57) ABSTRACT

System and method for displaying reaction animations that represent audience reactions to content. A reaction measurement module receives video data featuring at least one audience user from at least one video capture device. The reaction measurement module processes the video data to determine reaction data based on characteristics of the audience user's head. The reaction data is passed to a server and an animation-generation module generates animation data based on the reaction data. The animation data is passed to a user device for display. In some embodiments, the reaction animation(s) are displayed with the content in real or near real time. In other embodiments, the reaction animations are recorded for later viewing. In some embodiments, the animation(s) each represent multiple audience users.

20 Claims, 8 Drawing Sheets

(56) References Cited

OTHER PUBLICATIONS

Eun Lee, Jee In Kang, Il Ho Park, Jae-Jin Kim, and Suk Kyoon An. 2008. Is a neutral face really evaluated as being emotionally neutral? Psychiatry research 157, 1-3 (2008), 77-85.

Irfan Essa, Sumit Basu, Trevor Darrell, and Alex Pentland. 1996. Modeling, tracking and interactive animation of faces and heads// using input from video. In Proceedings Computer Animation'96, pp. 68-79. IEEE.

Karansher Singh, Jun Ohya, and Richard Parent. 1995. Human figure synthesis and animation for virtual space teleconferencing. In Proceedings Virtual Reality Annual International Symposium'95, pp. 118-126. IEEE.

Florian Mathis, Kami Vaniea, and Mohamed Khamis. 2021. Observing virtual avatars: The impact of avatars' fidelity on identifying interactions. In Academic Mindtrek 2021, pp. 154-164.

* cited by examiner

SYSTEM AND METHOD FOR DISPLAYING REACTION ANIMATIONS

RELATED APPLICATIONS

This application is a Non-Provisional US Patent Application which claims the benefit of U.S. Provisional Application No. 63/404,755 filed on Sep. 8, 2022.

TECHNICAL FIELD

The present invention relates to video communications. More specifically, the present invention relates to a system and method for displaying animations that represent audience reactions to video media.

BACKGROUND

Since the mid-2010s, there has been a sharp rise in the number of video communications in many contexts, including business, educational, academic, medical, and recreational contexts. As well, of course, the frequency of such communications was significantly accelerated by the COVID-19 pandemic and the corresponding decrease of in-person events. However, in many contexts, particularly those that feature one-to-many presentations (e.g., educational contexts with one teacher presenting slides to many students), both presenters and audience members report a significant loss of affective feedback. That is, due to the format of most video/teleconferencing systems, presenters often cannot see the faces of their audience or gauge their reactions. Similarly, audience members typically cannot see other audience members during presentations. As well, because of privacy concerns, personal preference, and/or 'video fatigue', many audience members do not have cameras turned on at all times during a video call (regardless of whether there is an active presentation). This lack of feedback can make video conferencing tedious and draining for many people, regardless of whether they are presenting or consuming content.

In other contexts, further, information about the reactions of audience members to video communications (e.g., live-streamed or pre-recorded video media) may be very helpful to content creators. Currently, there is no simple way to effectively or efficiently monitor audience reactions in real-time or near-real time as content is consumed. Present methods rely on the audience's after-the-fact statements (e.g., in reviews, social media posts) or on watching so-called "reaction videos". Although reaction videos record reactions in near-real time, they generally show the reactions of no more than a few individuals and do not scale effectively. As well, there is a self-selection effect with respect to who films and provides reaction videos, meaning that their reactions may not represent the reactions of the audience as a whole. Further, such methods typically do not allow audience reactions to be monitored, reviewed, or responded to, without substantial loss of audience user privacy.

Clearly, there is a need for systems and methods that overcome the shortcomings of the present art.

SUMMARY

This document discloses a system and method for displaying reaction animations that represent audience reactions to content. A reaction measurement module receives video data featuring at least one audience user from at least one video capture device. The reaction measurement module processes the video data to determine reaction data based on characteristics of the audience user's head. The reaction data is passed to a server and an animation-generation module generates animation data based on the reaction data. The animation data is passed to a user device for display. In some embodiments, the reaction animation(s) are displayed while the content is presented in real or near real time. In other embodiments, the reaction animations are recorded for later viewing.

In a first aspect, this document discloses a system for displaying animations to a user, said system comprising: a reaction measurement module receiving video data of an audience user from a video capture device, wherein said reaction measurement module determines reaction data from said video data and wherein said reaction data represents reactions of said audience user to content; a server, said server receiving said reaction data and said server further comprising: an animation-generation module for generating animation data based on said reaction data, said animation data being for use in a reaction animation; wherein said animation data is for sending to a computing device used by at least one user, wherein said reaction animation is displayed to said at least one user at said device, and wherein changes of said reaction animation are representative of movements of said audience user.

In another embodiment, this document discloses a system wherein said content is video content and said content is displayed to said user concurrently with said reaction animation.

In another embodiment, this document discloses a system wherein said content is one of: live and pre-recorded.

In another embodiment, this document discloses a system wherein the reaction data is based on characteristics of said audience user's head.

In another embodiment, this document discloses a system wherein said characteristics comprise at least one of: a position of said head relative to a predetermined point; a roll of said head; a pitch of said head; and a yaw of said head.

In another embodiment, this document discloses a system wherein said characteristics comprise facial characteristics.

In another embodiment, this document discloses a system wherein said facial characteristics comprise at least one of: a size of said audience user's mouth relative to an original size; a distance between said audience user's eyebrows and said audience user's eyes; and a distance between said audience user's jaw and a central point of said audience user's face.

In another embodiment, this document discloses a system wherein said reaction animation is shape-based and changes in shape of said reaction animation map to said movements of said audience user.

In another embodiment, this document discloses a system wherein said content is delivered to said user and said audience user through an active video communication channel and wherein said reaction animation is at least one of: displayed to all users of said video communication channel; displayed to a subset of users of said video communication channel; and displayed to only one user of said video communication channel.

In another embodiment, this document discloses a system wherein: said content is consumed by a plurality of audience users, each of said plurality of audience users having an associated video capture device, such that said server receives reaction data relating to each of said plurality of audience users; wherein said animation-generation module generates animation data for at least a subset of said plurality of audience users based on corresponding reaction data; said server further comprises a merging module for merging together said animation data from said at least a subset of said plurality of audience users, to thereby produce merged animation data; and said reaction animation is based on said merged animation data, such that said changes of said reaction animation are representative of movements of said at least a subset of said plurality of audience users.

In another embodiment, this document discloses a system wherein multiple reaction animations are generated, each of said reaction animations corresponding to a specific subset of said plurality of audience users.

In another embodiment, this document discloses a system wherein said reaction measurement module is hosted on at least one of: a computing device in communication with said video capture device; said server; and a second server.

In another embodiment, this document discloses a system wherein said reaction data is determined in near-real time and said reaction animation is updated in near-real time.

In another embodiment, this document discloses a system wherein said reaction animation is recorded and stored for non-real-time display.

In another embodiment, this document discloses a system wherein said merging is performed at least one of: synchronously; synchronously in near-real time; and asynchronously.

In another embodiment, this document discloses a system wherein at least one user is shown a different reaction animation than at least one other user.

In a second aspect, this document discloses a system for displaying animations to users, said system comprising: a reaction measurement module receiving video data of audience users from associated video capture devices, wherein said reaction measurement module determines reaction data from said video data and wherein said reaction data represents reactions of said audience users to content; a server receiving said reaction data and said server further comprising: an animation-generation module for generating animation data based on said reaction data, said animation data being for use in reaction animations; a merging module for merging together at least a subset of said animation data to thereby produce merged animation data; wherein said merged animation data is for sending to a computing device used by at least one of said users, wherein at least one reaction animation is displayed to said at least one of said users at said device, and wherein changes of said at least one reaction animation are representative of movements of at least a subset of said audience users.

In a third aspect, this document discloses a method for displaying animations to a user, said method comprising the steps of: receiving, from at least one video capture device, video data of at least one audience user consuming content; determining reaction data from said video data; based on said reaction data, generating animation data for use in a reaction animation; and sending said animation data to a computing device used by said user, wherein said animation data is used to display said reaction animation at said computing device and wherein changes of said reaction animation are representative of movements of said at least one audience user.

In another embodiment, this document discloses a method wherein said content is video content and said content is displayed to said user concurrently with said reaction animation.

In another embodiment, this document discloses a method wherein said content is one of: live and pre-recorded.

In another embodiment, this document discloses a method wherein multiple reaction animations are generated, each of said reaction animations corresponding to a specific subset of said audience users.

In another embodiment, this document discloses a method wherein said reaction animation is shape-based and changes in shape of said reaction animation map to said movements of said audience user.

BRIEF DESCRIPTION OF THE DRAWINGS

The present invention will now be described by reference to the following figures, in which identical reference numerals refer to identical elements and in which.

DETAILED DESCRIPTION

To better understand the present invention, the reader is directed to the listing of citations at the end of this description. For ease of reference, these citations and references have been referred to by their listing number throughout this document. The contents of the citations in the list at the end of this description are hereby incorporated by reference herein in their entirety.

This document discloses a system and method for displaying reaction animations that represent audience reactions to content. The reaction animation(s) are, in some embodiments, displayed concurrently with the content. In some embodiments, near-real-time audience reactions can thus be viewed during near-real-time content delivery. Further, in some embodiments, reaction animations are generated for pre-recorded media content and are stored by the system 10. In such embodiments, the content can be replayed, along with its associated reaction animations, for later analysis. The reaction animation(s) are, in one embodiment, delivered to all audience users and any other users of the system, such that each user can see the full audience reaction to the content. In contexts where there is a single presenter and many audience members, all users would preferably see the animation. However, in some embodiments, only one user or only a subset of users see the animation.

Figure 1:
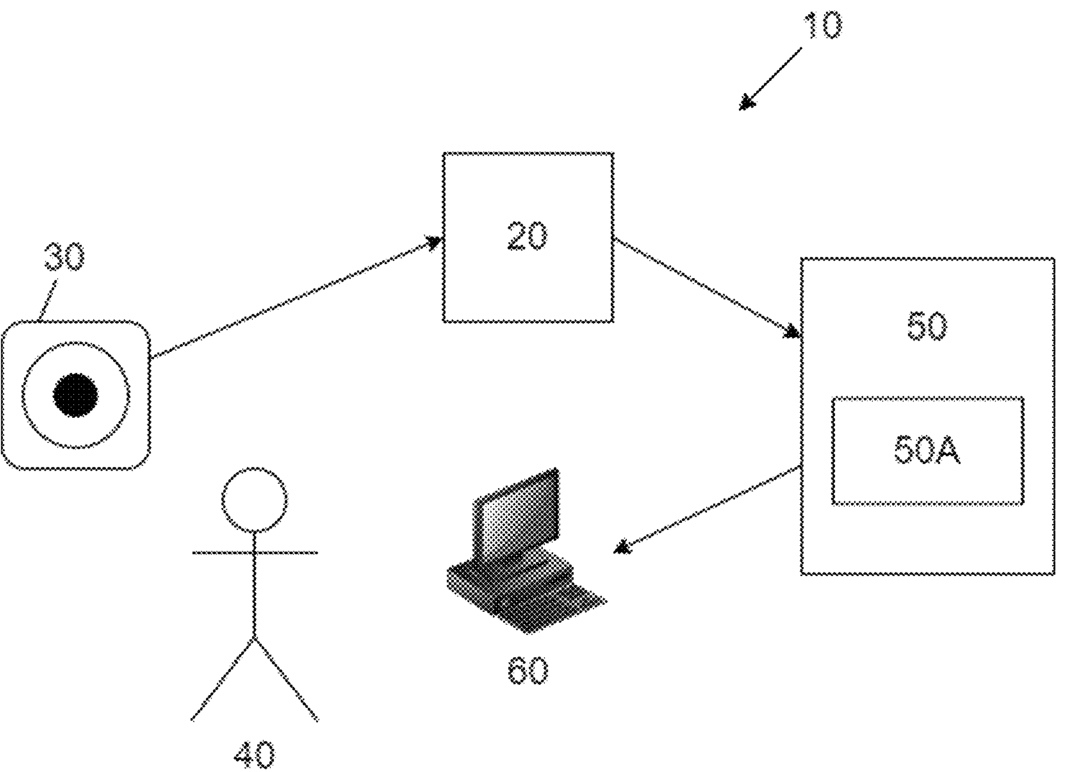
FIG. 1 is a block diagram of a system according to one aspect of the invention.

FIG. 1 is a block diagram showing a system 10 according to one aspect of the present invention. The system 10 comprises a reaction measurement module 20 that receives video data from at least one video capture device 30. The video capture device 30 captures video data featuring at least one audience user 40. In some embodiments, multiple faces are tracked within a video stream from a single video capture device 30, while in other embodiments a single video capture device 30 corresponds to a single audience user.

The reaction measurement module 20 receives and processes the video data to determine reaction data corresponding to the audience user. The reaction data corresponds to characteristics of the audience user's head, relative to reference and/or predetermined points. As such, changes in the reaction data reflect movements of the audience user's head and/or facial features/landmarks.

The reaction data is then passed to a server 50, which comprises an animation-generation module 50A. The animation-generation module 50A generates animation data from the reaction data. The animation data is then passed to a computing device 60 used by a user. The computing device 60 displays a reaction animation based on the animation data. In some embodiments, the reaction animation is displayed concurrently with the content on the device 60. In some embodiments, the animation is displayed without the content (e.g., to a person in the same physical location as a live-streamed performance, who would only wish to see the broader audience reaction.) As well, in some embodiments, the content can be displayed while the animation is suppressed (e.g., if a specific user does not wish to see the animation). Changes in the reaction animation represent changes in the characteristics of the audience user's head.

In some embodiments, moreover, reaction data for an audience user is collected regardless of whether that audience user enables their video feed. That is, an audience user participating in a video conference may wish to share only their anonymized reaction data through a representative animation, rather than also sharing live video of themselves. In such embodiments, the video capture device 30 would remain active and capture live video data for processing, but the video data would not need to be displayed to other participants in the video conference.

The content comprises any suitable form of content, including without limitation video content, video+audio content, audio-only content, live content, and pre-recorded content. Additionally, the system herein can be used in any suitable context, including educational, academic, business, entertainment, and gaming contexts. As non-limiting examples, the system could be used to display audience reaction animations for: a live-streamed gaming or sports competition; a pre-recorded academic presentation; a live concert; a pre-recorded film; a live conference call, and/or any other suitable form or type of content. As discussed further below, when pre-recorded content is used, the reaction animation is preferably updated to incorporate the reactions of each new audience user.

In FIG. 1, the audience user 40 is shown as using the computing device 60 to consume the content. However, it should be noted that other audience users will also see the reaction animation. Additionally, non-audience users will also see the reaction animation in various embodiments. For example, where the content is a live presentation of content, the reaction animation could also be displayed to a user presenting the content, although their own reactions would not necessarily be monitored during the presentation. Further, in contexts where the content is pre-recorded (e.g., entertainment contexts), users responsible for the content's creation (e.g., producers, directors, etc.) may view recorded reaction animations. Nothing in FIG. 1 should be considered to limit the potential viewers of the reaction animations or to require the data gathering and animation viewing to occur simultaneously.

The video capture device 30 may be any device suitable for capturing video data. In some embodiments, the video capture device 30 is a standalone video camera or webcam device. In other embodiments, the video capture device 30 comprises a video camera that is built into another device. In some embodiments, further, the video capture device 30 is integrated into the computing device 60 that the audience user uses to consume the content. As well, depending on the embodiment, multiple video capture devices 30 capture video data of a single audience user. The video data from the multiple video capture devices 30 is then fused together before being processed by the reaction measurement data 20.

In some embodiments, reaction measurement data is determined from each frame of received video data and associated animation data is generated for display, such that the reaction animation changes in near-real time. In other embodiments, reaction measurement data and/or animation data is generated at intervals during delivery of the content (e.g., every ten seconds, every minute, etc.). There is no limit on the duration of the interval; however, as would be understood, smaller intervals generally result in more nuanced information about audience reaction.

In some embodiments, reaction animations are generated and/or displayed for the entire duration of the content. In other embodiments, reaction animations are generated and/or displayed only for specific portions of the content. The portions to receive reaction animations may be user-selectable.

In some embodiments, the reaction animation is shape-based, and changes in the shape map to changes in the audience user's facial expression and head characteristics. Head characteristics comprise at least one of: a position of the user's head relative to a predetermined point (i.e., to a predetermined origin point); a roll of the user's head; a pitch of the user's head; and/or a yaw of the user's head. Facial characteristics comprise at least one of: a size of the user's mouth relative to an original size; a distance between the user's eyebrows and the user's eyes; and a distance between the user's jaw and a central point of the user's face. Other facial characteristics that provide additional information, including but not limited to the user's eye motion(s), are also used in some embodiments. Depending on the embodiment, some of these measured characteristics are mapped to a reaction animation on a one-to-one scale, while some characteristics may be subject to transformations, including both linear and non-linear transformations. As one example, the distance between the user's eyebrows and the eyes may be exaggerated, in some embodiments, so that that the animation more effectively conveys the affective content of users' eyebrow motions.

Figure 2:
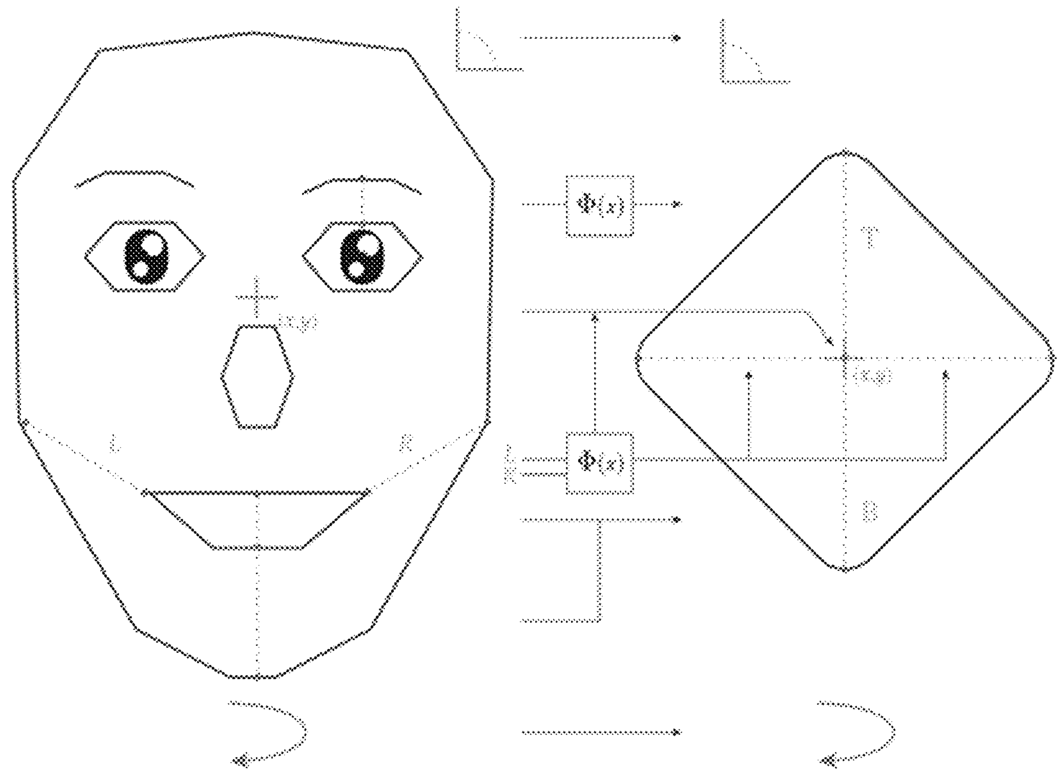
FIG. 2 is a schematic image showing an exemplary mapping for one embodiment of the invention.
Figure 3A:
FIGS. 3A to 3F show the generation of a reaction animation according to the embodiment of FIG. 2.
Figure 3B:
Figure 3C:
Figure 3D:
Figure 3E:
Figure 3F:

FIG. 2 is a schematic image showing a mapping of measured head and facial characteristics to a shape-based animation. The 'neutral shape', in this implementation, is a regular diamond with rounded corners. However, of course, such a neutral shape is simply one potential choice of base for the animation and should be considered to limit the scope of the present invention.

Characteristics of the stylized user's face on the left are measured from received video data and mapped to the shape-based animation. In one implementation, with the neutral shape at position (x,y), the following mapping transformations are used:

1. The user head origin (a,b) maps to the neutral shape origin (x,y) as: $(x+a*c_\alpha, x+b*c_\alpha)$, where $c_\alpha$ is a normalizing constant.
2. The user head roll maps to the animation's roll via angle translation between the edge of the face to the nose.
3. The user head yaw maps to the animation's yaw via left/right distances from the edge of the lips to the edge of the cheek, linearly translated to the left and right halves of the animated shape.

4. The distance between the bottom of the jaw to the top of the mouth (d) increases the size of the bottom quarter of the animated shape (line B) as ($b+d*c_ß$) where $c_ß$ is a normalizing constant.
5. The relative size of the mouth is non-linearly mapped to the animated shape as follows:
   i) mouthMagnitude=(horizontal_size_of_mouth/horizontal_size_of_face)$^2$
   ii) Animated Shape·y+=sin(t$c_1$)*mouthMagnitude*$c_2$
      $c_1$ and $c_2$ are constants that are calibrated by an administrator of the system 10 and/or automatically, such that (1) the animated shape moves at an aesthetically pleasing frequency, and (2) the animated shape is static when at rest.
6. The distance between the eyebrow (d e) to the top of the eyes is non-linearly mapped to the top half of the animated shape (line T) as follows:
   i) Define $ax^3+bx^2+cx+d$, where
      (a, b, c, d)=(−1.13e+4, 5.63e+3, −2.93e+2, −50.4)
      Note that these values were chosen based on experimental tests and other values may of course be used.
   ii) Let the minimum value of the polynomial in i) be 0, and its maximum value be 0.33. (Again, note that these values were chosen based on experimental tests and other values may of course be used, as suitable.)
   iii) Acquire the min and max values of d e through user facial feedback (i.e., using direct user calibration or by automatic analysis of video data of the user).
   iv) Linearly interpolate the min and max values of $d_e$ to be [poly_min, poly_max].

FIGS. 3A to 3F show a reaction animation according to such an implementation, along with the video frames the reaction animation is based on. This animated shape in this implementation is calibrated to the specific user's face. The user's head is shown on the left of each of FIGS. 3A to 3F. Various facial features are associated with markers that are tracked as the user's head moves, to facilitate determining the reaction data. Based on the gathered reaction data, the animation on the right of each figure is generated. As can be seen, shape changes of the animation correspond to changes in the user's head position and/or facial expression.

Figure 4:
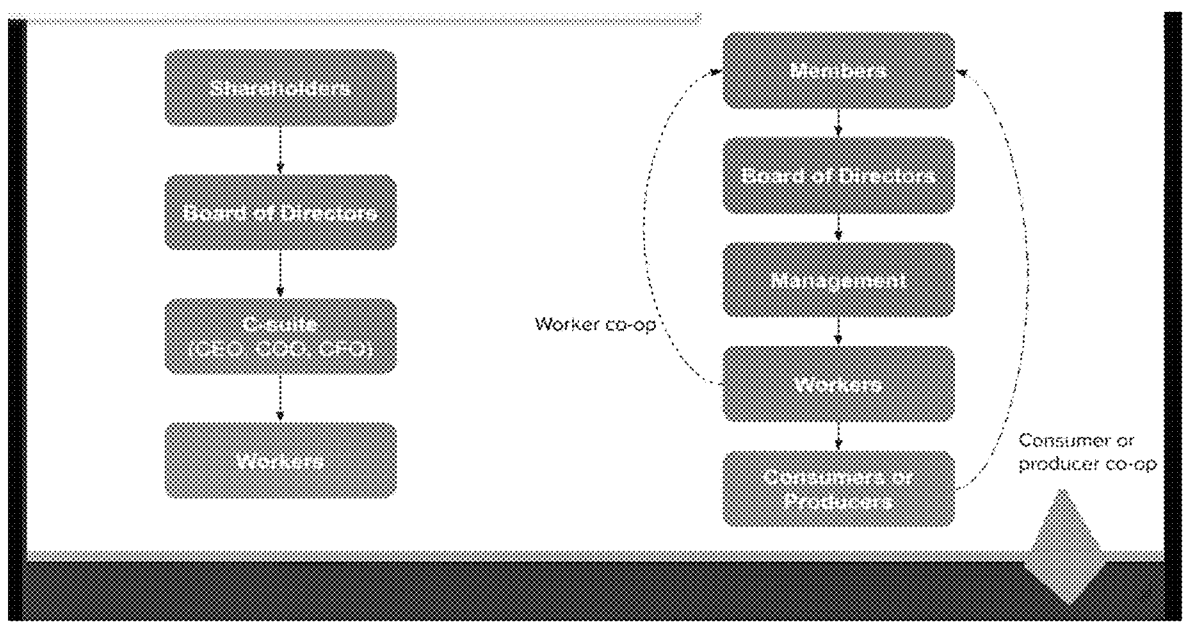
FIG. 4 shows a reaction animation according to the embodiment of FIG. 2 displayed along with content.

FIG. 4 shows such a reaction animation displayed with associated content (in this case, an exemplary presentation). The reaction animation can be overlaid on the content, as in this example, or displayed separately from the content itself (e.g., in a separate window).

Of course, the above mapping merely represents one possible animation style. Any suitable neutral shapes can be used as the basis shape and any desired transformation(s) can be applied, as may be determined by the person skilled in the art.

In some embodiments, further, a single reaction animation is based on multiple audience users. That is, a single displayed animation is based on the reactions of a plurality of simultaneous and/or non-simultaneous audience users. In such embodiments, the server 50 further comprises a merging module for merging together reaction measurement data from multiple users, before the animation-generation module generates animation data. The resulting reaction animation is thus based on reaction data from multiple users. Such merging is, in some embodiments, performed synchronously, in real-time or near-real-time, with the delivery of the content. In embodiments with recorded/replayable reaction animations, merging can also be performed asynchronously, as further discussed below.

Figure 5:
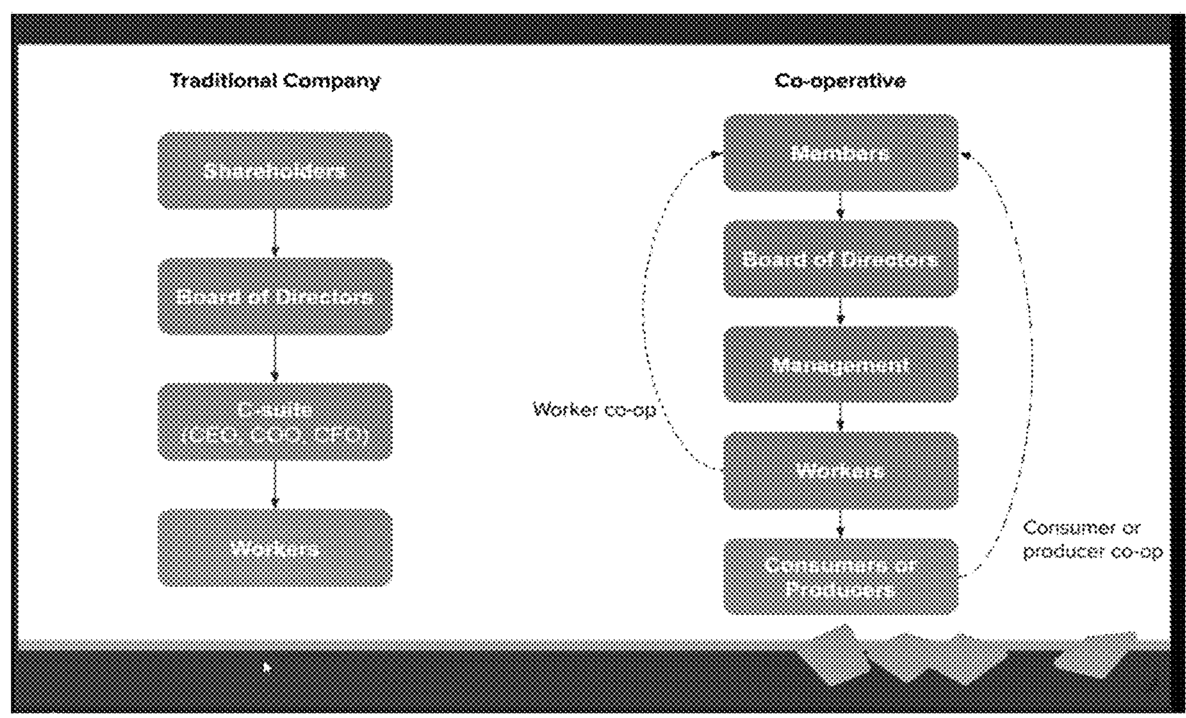
FIG. 5 shows displayed reaction animations according to another embodiment of the invention.

Additionally, in some embodiments, multiple reaction animations are displayed for a single piece of content. For example, where the audience is large, it may be desirable to view reactions of subsets of the audience users, rather than combining all audience users' reaction into a single animation. (In particular, if large numbers of audience users were depicted in a single animation, the animation would be in constant or near-constant motion and would likely be difficult for viewers to interpret.) Such an embodiment is shown in FIG. 5, in which four distinct reaction animations are shown.

The subsets are, in some embodiments, formed automatically based on objective parameters, such as the order in which each user viewed the content/joined the presentation/etc. Subsets can also be determined based on geographic or network criteria (e.g., similar IP addresses), audience user device criteria, and/or other criteria, including user-identified criteria. For example, in some embodiments, one reaction animation could be based on the reactions of a subset of audience users that comprises university professors and another reaction animation could be based on the reactions of a subset of audience users that comprises university students. Of course, more detailed subsets would require additional information about each user and may not be practical or desired in all implementations. In some embodiments, information submitted by the user is used for clustering. Further, in some embodiments, well-known clustering algorithms such as, e.g., Gaussian Mixture Models (GMM) or K-Means clustering models, are applied to real-time video data to determine suitable clusters.

Subsets can also be determined on an ongoing basis based on user's facial expression at a given point. That is, a specific user may be represented by different animations at different points. For example, if half of the audience is smiling widely and half is frowning and shaking their heads, the system may separate these groups so that the distinct reactions are more visible, rather than generating two animations with less distinct expressions. When the audience user(s) expression(s) change, they can be assigned to a different subset. As would be understood, well-known algorithmic approaches may be particularly suitable for this flexible, real-time implementation.

In some embodiments, further, different users see different reaction animations. That is, reaction animations are user-customizable in some embodiments. A user could select a preferred shape, style, color, size, etc. of the visible animation. (Where the animation is shape-based, of course, the specific contour changes of the shape would not be controlled by the user, but they could select a preferred neutral shape for modifications.) Additionally, depending on the embodiment, a user may be able to toggle between animations showing different subsets of the audience.

Figure 6A:
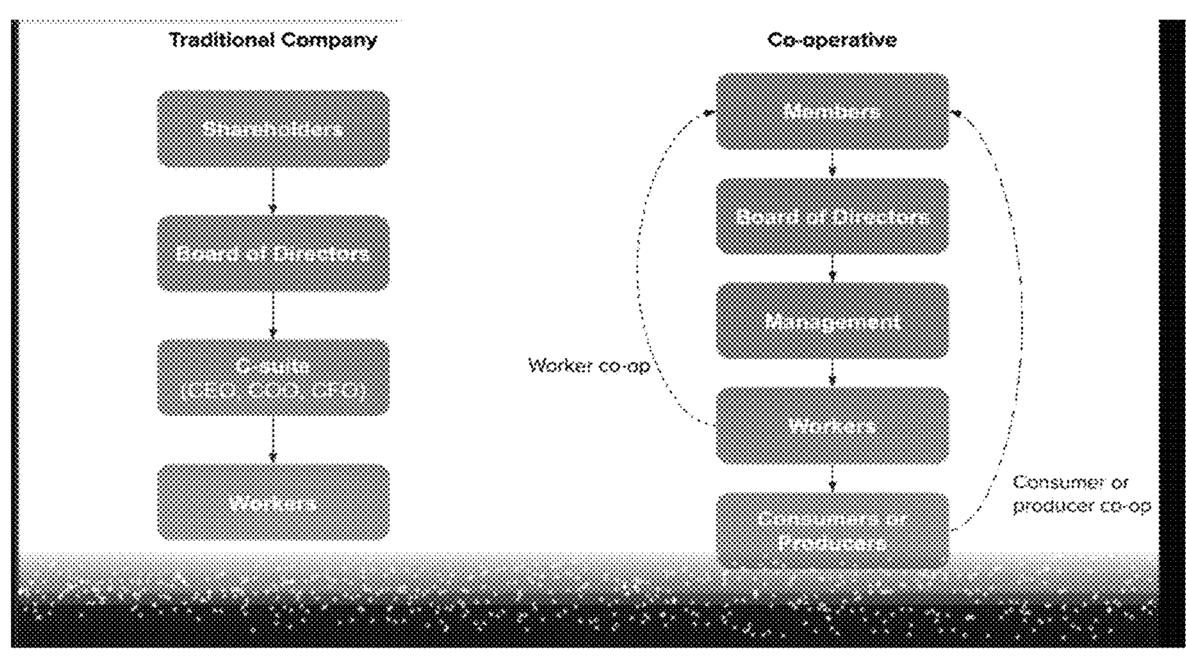
FIGS. 6A to 6C shows a displayed reaction animation according to another embodiment of the invention.
Figure 6B:
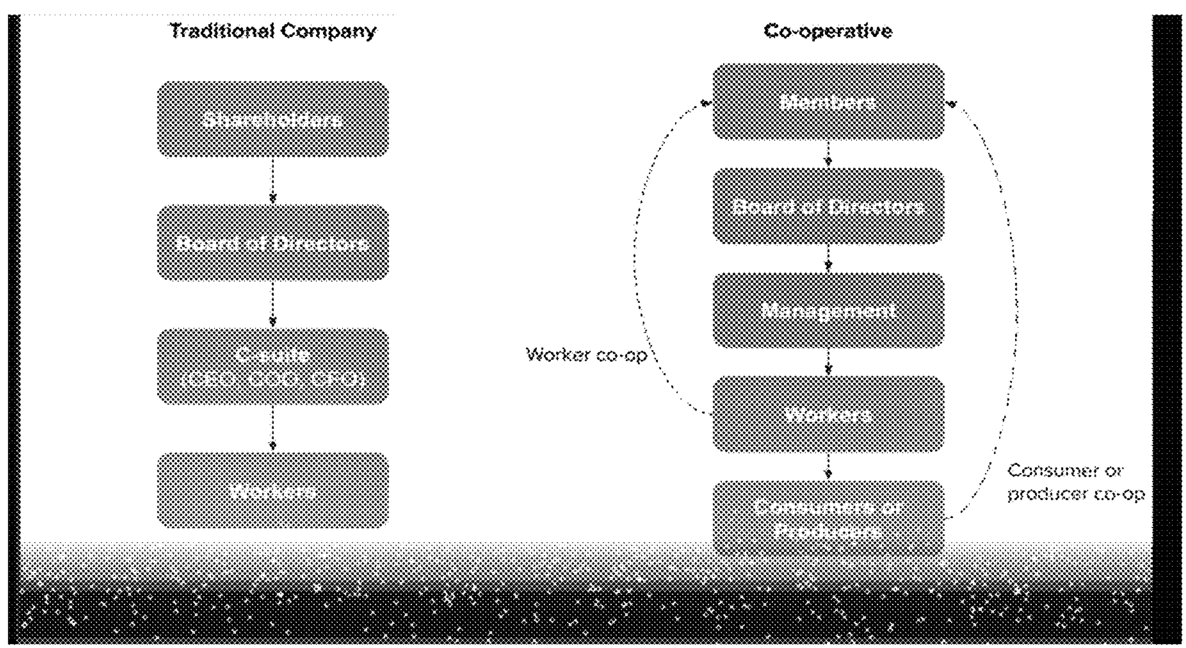
Figure 6C:
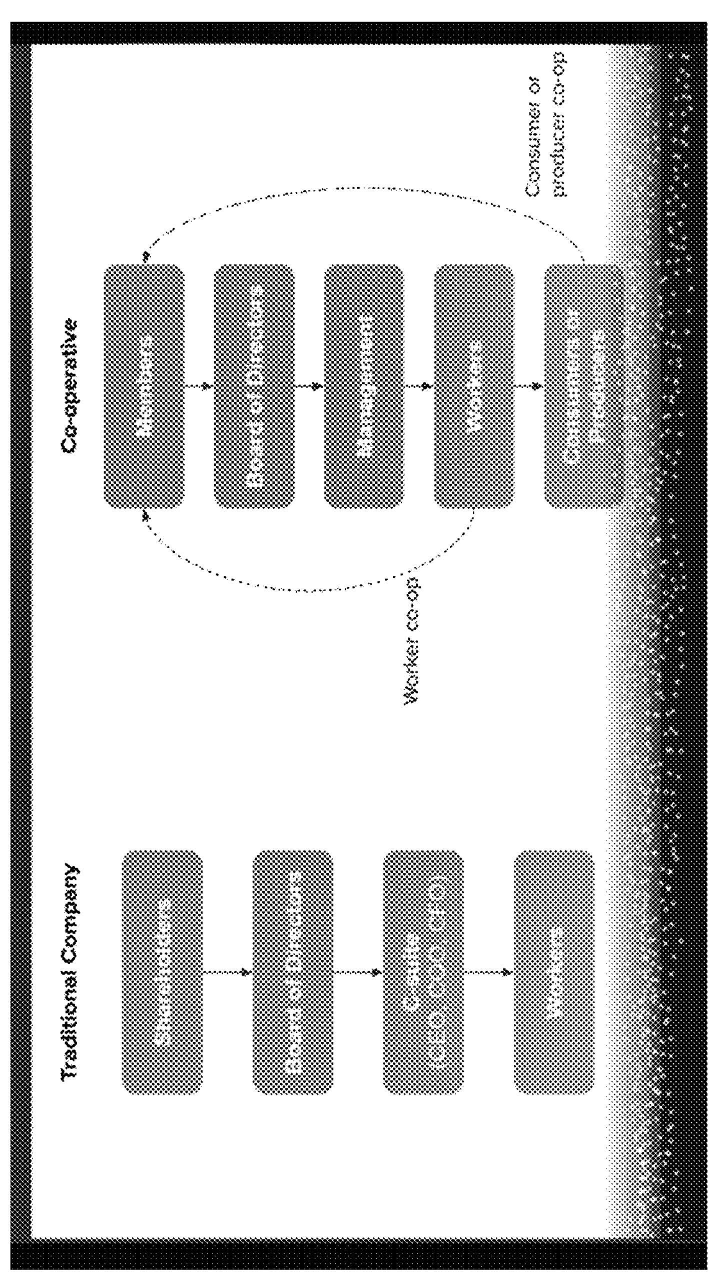

Further, in some embodiments, reaction animations are not shape-based or anthropomorphic or even semi-anthropomorphic. That is, in such embodiments, the changing head and facial characteristics are not directly mapped to contours of a neutral shape. FIGS. 6A to 6C show such an embodiment. In this exemplary implementation, separate small particles each represent one or more audience users, and the user reactions as measured by the reaction measurement module 20 correlate to a speed and a direction of motion for each particle. Such an implementation may be particularly useful for extremely large audiences, as it conveys a more general impression of audience reaction. FIG. 6A, for example, shows an animation for mixed audience reaction. That is, there is no particular pattern visible and there is no trend in the distance of each particle from a central axis of the animation (i.e., the particles are neither very close to the axis nor very far from the axis.). FIG. 6B represents a more excited audience: the particles are generally further from each other than in FIG. 6A and some are crossing up on to the content itself. This suggests that the associated face and head movements of the audience members are more exaggerated at the time of FIG. 6B than at the time of FIG. 6A. In contrast, FIG. 6C shows a more muted audience response, where the particles are close to the central axis and close to each other.

The exemplary many-particle implementation shown in FIGS. 6A to 6C can be implemented according to the following equation:

$$\text{Particle motion}=f(t)+\text{turbulence}(a)+\text{speed}(b)+\text{spread}(d)+pos(e)$$

wherein parameter t is time and f( ) is a general particle motion function that moves a particle left to right in an organic pattern (e.g., f(t)=sin(t*frequency+particle position)*amplitude). Parameters a, b, d, and e are determined by forming subsets of the audience using, e.g., known clustering techniques such as Gaussian mixture models or k-means clustering, as follows:

- parameter a represents clusters based off facial expression, and accounts for large facial expression movement from a minority of people;
- parameter b represents optical flow (global movement);
- parameter d represent clusters based off body motion/head motion. Lower cluster counts for parameter d indicate that many users are simultaneously performing the same motions (e.g., nodding their heads), and thus lower values of parameter d have more effect on the overall animation; and
- parameter e represents major clusters of facial characteristics (i.e., whether many people simultaneously have similar expressions, such as raised eyebrows or open mouths).

Of course, again, nothing in this example should be taken as limiting the design of any reaction animation or limiting the scope of the present invention in any way.

In some embodiments, the reaction measurement module 20 is hosted on the audience user's device. That is, in some embodiments, the reaction measurement module 20 comprises downloadable or web-based software that uses a processing unit on the audience user's device 60 and/or video capture device 30 to process the video data before transmitting to the server 50. In other embodiments, the reaction measurement module 20 is also hosted on the server 50, while, in further embodiments, the reaction measurement module 20 is hosted on a separate remote server. Of course, the person skilled in the art would be able to determine the relative advantages of a particular implementation. For example, in embodiments with large numbers of audience users, it may be preferable to host the reaction measurement module 20 as separate instances on devices used by each audience user (e.g., their viewing devices 60 and/or their video capture devices 30), to thereby reduce the amount of video data that is transmitted over the network, decreasing bandwidth requirements and improving animation-generation speed.

In particular, video data of the audience user(s) is preferably processed at each user's device to determine reaction data, so that the reaction data is suitably anonymized. As the reaction data is based on relatively high-level head and/or face characteristics, the reaction data itself does not contain significant amounts of personally identifiable information (PII). In particular, reverse-engineering reaction data would not result in a high-fidelity video of the audience user. Further, of course, the reaction animation itself is significantly anonymized to only capture face/head motions, rather than the user's appearance. This allows users who do not wish to always share video of themselves to nevertheless provide reaction feedback to other users.

In some embodiments, the reaction measurement module 20 is calibrated to the audience user's face before content is delivered through the system. Such a facial calibration process allows the reaction measurement module 20 to determine reference points on the audience user's face, which permits more accurate reaction data to be generated and thus permits greater accuracy in the generated animation.

The server 50, as would be understood by the person skilled in the art, may be a single hardware unit or comprise several hardware units located in a single physical location. In other embodiments, the server 50 may be a distributed and/or cloud server, comprising multiple hardware units and/or parts of hardware units at various networked locations. As well, as should be understood, the server 50 is generally remote from the majority of users of the system 10. That is, the audience users 40 and any presenting user (for live content) are generally not in the same physical location and are, in general, not at the same physical location as the server 50. However, depending on the implementation, some users may be present in the same physical location as each other and/or as the server 50.

As mentioned above, in some embodiments, reaction animations are generated for pre-recorded media content and are stored by the system 10. In such embodiments, the reaction data, the animation data, the generated animation, or any combination thereof are stored in at least one database accessible by the server 50. Of course, it is also possible to record and keep the gathered video data itself, but such an implementation is generally not preferred, because of privacy concerns and because of the storage requirements of such an implementation.

In some such embodiments, the reaction data is collected from audience users while they consume the content and processed as above to generate animation data. That animation data is fused with previously generated animation data representing other audience users. In such embodiments, the reaction animation displayed to the current user would be based on that user as well as on previous users. Merging in such embodiments could be performed iteratively (i.e., the reaction data for each new 'current user' would be added to reaction data of previous users). As such, the current user would have an indication of others' reactions to the media, regardless of whether the other users were concurrently consuming the content. In other such embodiments, a specific audience user's reaction data is gathered without displaying a reaction animation to that user. For example, an audience user may wish to consume certain content without seeing reaction information while also being willing to have their own reactions logged.

As well, in some embodiments, users can view a reaction animation that is only based on other audience users' reactions (i.e., a specific audience user can view a reaction animation without contributing their own reactions, for example, by changing user settings or by disconnecting/disabling a video capture device). Such an embodiment may be useful, for example, for individuals responsible for content production in an entertainment context, to determine elements of a video that were particularly engaging for audience users or that were particularly dull.

Figure 7:
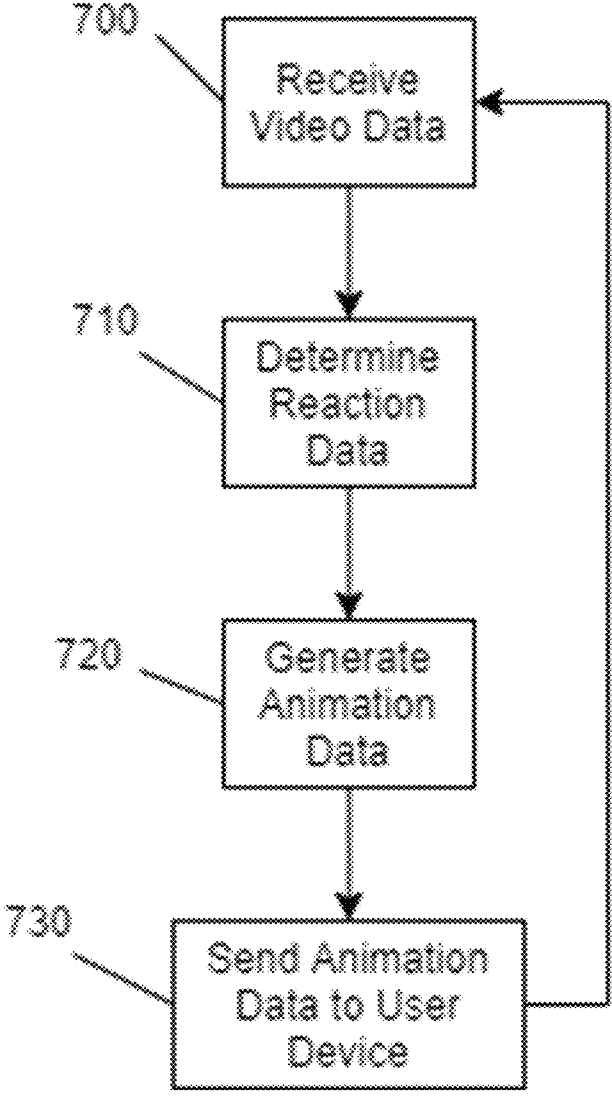
FIG. 7 is a flowchart detailing a method according to one aspect of the invention.

FIG. 7 is a flowchart detailing a method according to one aspect of the invention. At step 700, video data featuring at least one audience user is received. The video data is processed to thereby determine reaction measurement data at step 710. The reaction measurement data is processed at step 720 to thereby generate animation data. At step 730, the animation data is sent to a user's device for display. The method repeats as long as new video data is provided for processing, or as long as otherwise instructed.

As noted above, for a better understanding of the present invention, the following references may be consulted. Each of these references is hereby incorporated by reference in its entirety:

[1] Mariam Hassib, Stefan Schneegass, Niels Henze, Albrecht Schmidt, and Florian Alt. 2018. A Design Space for Audience Sensing and Feedback Systems. In *Extended Abstracts of the* 2018 *CHI Conference on Human Factors in Computing Systems.* 1-6.

[2] Eun Lee, Jee In Kang, Il Ho Park, Jae-Jin Kim, and Suk Kyoon An. 2008. Is a neutral face really evaluated as being emotionally neutral? *Psychiatry research* 157, 1-3 (2008), 77-85.

[3] Irfan Essa, Sumit Basu, Trevor Darrell, and Alex Pentland. 1996. Modeling, tracking and interactive animation of faces and heads//using input from video. In *Proceedings Computer Animation '*96, pp. 68-79. IEEE.

[4] Karansher Singh, Jun Ohya, and Richard Parent. 1995. Human figure synthesis and animation for virtual space teleconferencing. In *Proceedings Virtual Reality Annual International Symposium '*95, pp. 118-126. IEEE.

[5] Florian Mathis, Kami Vaniea, and Mohamed Khamis. 2021. Observing virtual avatars: The impact of avatars' fidelity on identifying interactions. In *Academic Mindtrek* 2021, pp. 154-164.

As used herein, the expression "at least one of [x] and [y]" means and should be construed as meaning "[x], [y], or both [x] and [y]".

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'video data', 'data objects', 'data files' and all other such terms should be taken to mean digital files and/or data objects, unless otherwise specified. Further, all video data should be understood as comprising multiple digital images.

Embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for displaying animations to a user, said system comprising:

a reaction measurement module receiving video data of an audience user from a video capture device, wherein said reaction measurement module determines reaction data from said video data and wherein said reaction data represents reactions of said audience user to content;

a server, said server receiving said reaction data and said server further comprising:

an animation-generation module for generating animation data based on said reaction data, said animation data being for use in a reaction animation;

wherein said animation data is for sending to a computing device used by at least one user, wherein said reaction animation is displayed to said at least one user at said device, wherein changes of said reaction animation are representative of movements of said audience user, wherein said changes in said reaction animation are one of:

changing from a first two-dimensional non-facial shape to at least one second two-dimensional non-facial shape; and movement of a plurality of particles displayed on said computing device, an amount of movement of said particles being based on one or more of: large facial expression movements from a minority of said audience users; general movements of all of said audience users; and similar movements and facial expressions of many of said audience users at a specific time, wherein each two-dimensional non-facial shape is representative of at least one audience user, wherein an origin of said at least one audience user's head maps to a geometric origin of said each two-dimensional non-facial shape, and wherein said reaction data is representative of user engagement with said content.

2. The system according to claim 1, wherein said content is video content and said content is displayed to said user concurrently with said reaction animation.

3. The system according to claim 1, wherein said content is one of: live and pre-recorded.

4. The system according to claim 1, wherein the reaction data is based on characteristics of said audience user's head.

5. The system according to claim 2, wherein said characteristics comprise at least one of:

a position of said head relative to a predetermined point;

a roll of said head;

a pitch of said head; and a yaw of said head.

6. The system according to claim 2, wherein said characteristics comprise facial characteristics.

7. The system according to claim 4, wherein said facial characteristics comprise at least one of:

a size of said audience user's mouth relative to an original size;

a distance between said audience user's eyebrows and said audience user's eyes; and a distance between said audience user's jaw and a central point of said audience user's face.

8. The system according to claim 1, wherein changing from a first two-dimensional non-facial shape to at least one second two-dimensional non-facial shape maps to said movements of said audience user.

9. The system according to claim 1, wherein said content is delivered to said user and said audience user through an active video communication channel and wherein said reaction animation is one of:

displayed to all users of said video communication channel;

displayed to a subset of users of said video communication channel; and displayed to only one user of said video communication channel.

10. The system according to claim 1, wherein:

said content is consumed by a plurality of audience users, each of said plurality of audience users having an associated video capture device, such that said server receives reaction data relating to each of said plurality of audience users;

wherein said animation-generation module generates animation data for at least a subset of said plurality of audience users based on corresponding reaction data;

said server further comprises a merging module for merging together said animation data from said at least a subset of said plurality of audience users, to thereby produce merged animation data; and said reaction animation is based on said merged animation data, such that said changes of said reaction animation are representative of movements of said at least a subset of said plurality of audience users.

11. The system according to claim 9, wherein multiple reaction animations are generated, each of said reaction animations corresponding to a specific subset of said plurality of audience users.

12. The system according to claim 1, wherein said reaction measurement module is hosted on at least one of: a computing device in communication with said video capture device; said server; and a second server.

13. The system according to claim 1, wherein said reaction data is determined in near-real time and said reaction animation is updated in near-real time.

14. The system according to claim 1, wherein said reaction animation is recorded and stored for non-real-time display.

15. The system according to claim 1, wherein at least one user is shown a different reaction animation than at least one other user.

16. A system for displaying animations to users, said system comprising:

a reaction measurement module receiving video data of audience users from associated video capture devices, wherein said reaction measurement module determines reaction data from said video data and wherein said reaction data represents reactions of said audience users to content;

a server receiving said reaction data and said server further comprising:

an animation-generation module for generating animation data based on said reaction data, said animation data being for use in reaction animations;

a merging module for merging together at least a subset of said animation data to thereby produce merged animation data;

wherein said merged animation data is for sending to a computing device used by at least one of said users, wherein at least one reaction animation is displayed to said at least one of said users at said device, wherein changes of said at least one reaction animation are representative of movements of at least a subset of said audience users, wherein said changes of said at least one reaction animation are one of:

changing from a first two-dimensional non-facial shape to at least one second two-dimensional non-facial shape; and movement of a plurality of particles displayed on said computing device, an amount of movement of said particles being based on one or more of: large facial expression movements from a minority of said audience users; general movements of all of said audience users; and similar movements and facial expressions of many of said audience users at a specific time, wherein each two-dimensional non-facial shape is representative of at least one audience user, wherein an origin of said at least one audience user's head maps to a geometric origin of said each two-dimensional non-facial shape, and wherein said reaction data is representative of user engagement with said content.

17. A method for displaying animations to a user, said method comprising the steps of:

receiving, from at least one video capture device, video data of at least one audience user consuming content;

determining reaction data from said video data;

based on said reaction data, generating animation data for use in a reaction animation; and sending said animation data to a computing device used by said user, wherein said animation data is used to display said reaction animation at said computing device wherein changes of said reaction animation are representative of movements of said at least one audience user, wherein said changes in said reaction animation are one of:

changing from a first two-dimensional non-facial shape to at least one second two-dimensional non-facial shape; and movement of a plurality of particles displayed on said computing device, an amount of movement of said particles being based on one or more of: large facial expression movements from a minority of said audience users; general movements of all of said audience users; and similar movements and facial expressions of many of said audience users at a specific time, wherein each two-dimensional non-facial shape is representative of at least one audience user, wherein an origin of said at least one audience user's head maps to a geometric origin of said each two-dimensional non-facial shape, and wherein said reaction data is representative of user engagement with said content.

18. The method according to claim 17, wherein said content is video content and said content is displayed to said user concurrently with said reaction animation.

19. The method according to claim 17, wherein multiple reaction animations are generated, each of said reaction animations corresponding to a specific subset of said audience users.

20. The method according to claim 17, wherein changing from a first two-dimensional non-facial shape to at least one second two-dimensional non-facial shape maps to said movements of said audience user.

* * * * *